(12) United States Patent
Taubman

(10) Patent No.: US 8,199,126 B1
(45) Date of Patent: Jun. 12, 2012

(54) USE OF POTENTIAL-TOUCH DETECTION TO IMPROVE RESPONSIVENESS OF DEVICES

(75) Inventor: Gabriel Taubman, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 28 days.

(21) Appl. No.: 13/185,466

(22) Filed: Jul. 18, 2011

(51) Int. Cl.
G06F 3/041 (2006.01)
G09G 5/00 (2006.01)

(52) U.S. Cl. ........................................ 345/173; 345/156

(58) Field of Classification Search .................... 345/173
See application file for complete search history.

(56) References Cited

U.S. PATENT DOCUMENTS

| | | | |
|---|---|---|---|
| 6,392,962 | B1 | 5/2002 | Wyatt |
| 7,764,274 | B2 | 7/2010 | Westerman et al. |
| 7,777,732 | B2 | 8/2010 | Herz et al. |
| 7,778,118 | B2 | 8/2010 | Lyons et al. |
| 7,805,171 | B2 | 9/2010 | Alameh et al. |
| 7,855,718 | B2 | 12/2010 | Westerman |
| 2006/0244733 | A1 | 11/2006 | Geaghan |
| 2007/0152976 | A1 | 7/2007 | Townsend et al. |
| 2007/0236478 | A1 | 10/2007 | Geaghan et al. |
| 2008/0158145 | A1 * | 7/2008 | Westerman ................ 345/156 |
| 2009/0195497 | A1 * | 8/2009 | Fitzgerald et al. ............ 345/156 |
| 2009/0225043 | A1 | 9/2009 | Rosener |
| 2009/0322497 | A1 | 12/2009 | Ku et al. |
| 2010/0110368 | A1 | 5/2010 | Chaum |
| 2010/0149073 | A1 | 6/2010 | Chaum et al. |
| 2010/0214253 | A1 | 8/2010 | Wu et al. |
| 2011/0007908 | A1 | 1/2011 | Rosener et al. |
| 2011/0084921 | A1 | 4/2011 | Kang et al. |
| 2011/0109577 | A1 | 5/2011 | Lee et al. |

FOREIGN PATENT DOCUMENTS

| EP | 1335318 A2 | 8/2003 |
|---|---|---|
| WO | WO 01/69830 | 9/2001 |

OTHER PUBLICATIONS

Kim et al. "Capacitive tactile sensor array for touch screen application" Sensors and Actuators A: Physical, vol. 165, Issue 1, Jan. 2011, pp. 2-7, available at http://www.sciencedirect.com/science/article/pii/S0924424709005573 (last visited on Jul. 18, 2011).
Lumelsky et al. "Sensitive Skin" IEEE Sensors Journal, vol. 1, No. 1, Jun. 2001. pp. 41-51, available at http://www.media.mit.edu/resenv/classes/MAS965/readings/sensitiveskin.pdf (last visited on Jul. 18, 2011).

* cited by examiner

*Primary Examiner* — Alexander S Beck
*Assistant Examiner* — Charles V Hicks
(74) *Attorney, Agent, or Firm* — McDonnell Boehnen Hulbert & Berghoff LLP

(57) ABSTRACT

Methods and apparatus related classifying touch events are disclosed. A first event is detected at a touch interface of a wearable computing device. Detecting the first event includes detecting a first capacitance change at the touch interface. A first-event signature of the first event is determined based on at least the first capacitance change. A first-event classification for the first event is selected from among a touch classification and a potential-touch classification based on the first-event signature. A first-event confidence value for the first-event classification is determined. Contextual information during a predetermined time after detecting the first event is obtained. The first-event classification can be adjusted based on the contextual information.

20 Claims, 11 Drawing Sheets

USE OF POTENTIAL-TOUCH DETECTION TO IMPROVE RESPONSIVENESS OF DEVICES

Unless otherwise indicated herein, the materials described in this section are not prior art to the claims in this application and are not admitted to be prior art by inclusion in this section.

Computing devices are typically connected to one or more input devices, such as a keyboard, microphone, camera, and/or touch interfaces, such as touch pads. A touch pad can be used to receive input from a user via touching the touch pad directly, or in some embodiments, via use of a stylus or other touching instrument.

Touch pads are widely used in mobile devices, as touch pads are often easy to use and do not have projections to catch on objects, such as pockets or bags, that hold mobile devices. In some cases, the touch pad can return inaccurate information about touches being made on the touch surface. For example, touches can be missed, locations of touches can be inaccurate, and false touches can be registered on the touch pad.

Touch interfaces, such as touch pads, can utilize one or more of a variety of technologies to detect the presence and location(s) of one or more touches. Example technologies include capacitive touch interfaces that measure changes in electrical capacitance, resistive touch interfaces that measure changes in electrical resistance, surface acoustic wave touch interfaces that measure changes in ultrasonic waves, and infrared touch interfaces that measure changes in a pattern of light beams.

SUMMARY

In a first aspect of the disclosure of the application, a method is provided. A first event is detected at a touch interface of a wearable computing device. Detecting the first event involves detecting a first capacitance change at the touch interface. A first-event signature of the first event is determined based on at least the first capacitance change. A first-event classification for the first event is selected from among a touch classification and a potential-touch classification based on the first-event signature. A first-event confidence value for the first-event classification is determined. Contextual information during a predetermined time after detecting the first event is obtained. The first-event classification is adjusted based on the contextual information.

In a second aspect of the disclosure of the application, a wearable computing device is provided. The wearable computing device includes a touch interface, a processor, and memory. The memory has one or more instructions that, in response to execution by the processor, cause the wearable computing device to perform functions. The functions include: (a) detecting a first event at the touch interface by at least detecting a first capacitance change at the touch interface, (b) determining a first-event signature of the first event based on at least the first capacitance change, (c) selecting a first-event classification for the first event from among a touch classification and a potential-touch classification based on the first-event signature, (d) determining a first-event confidence value for the first-event classification, (e) obtaining contextual information during a predetermined time after detecting the first event, and (f) adjusting the first-event classification based on the contextual information.

In a third aspect of the disclosure of the application, an article of manufacture is provided. The article of manufacture includes a computer-readable storage medium having instructions stored thereon that, in response to execution by a processor, cause the processor to perform functions. The instructions include: (a) instructions for detecting a first event at a touch interface by at least detecting a first capacitance change at the touch interface, (b) instructions for determining a first-event signature of the first event based on at least the first capacitance change, (c) instructions for selecting a first-event classification for the first event from among a touch classification and a potential-touch classification based on the first-event signature, (d) instructions for determining a first-event confidence value for the first-event classification, (e) instructions for obtaining contextual information during a predetermined time after detecting the first event, and (f) instructions for adjusting the first-event classification based on the contextual information.

DETAILED DESCRIPTION

Overview

Figure 1:
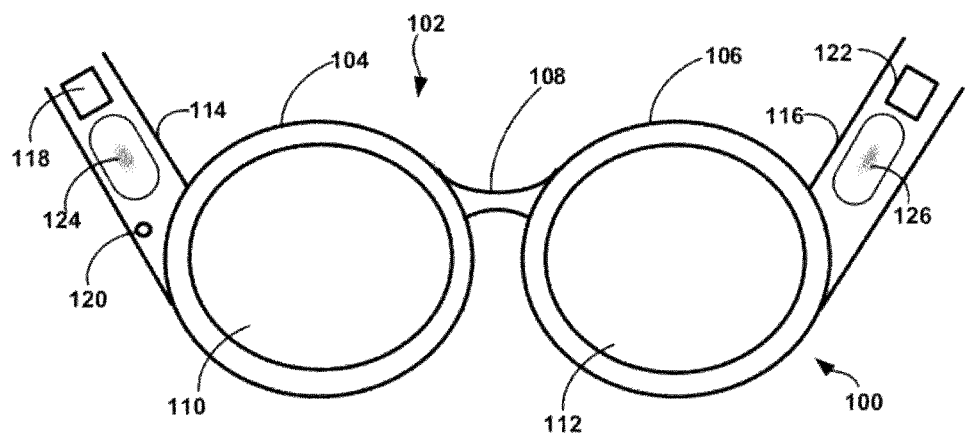
FIG. 1 is a first view of an example system for receiving, transmitting and displaying data, in accordance with an example embodiment.

A computer with a touch interface, such as a wearable computing device, can be configured to distinguish between "touch events" and "potential-touch events." A touch event can be an event where the touch interface is used intentionally, while a potential-touch event can be an event where the touch interface may be used unintentionally or intentionally. For example, if a user presses a button shown on the touch interface, the button press would be a touch event. If the user also touches a second region of the touch interface while pressing the button, this additional touch would likely be an intentional potential-touch, since the touch of the touch interface was intended to communicate via the touch interface, just not the touch of the second region. As another example, if the user grabs the touch interface to prevent the wearable computer from falling, the grab would be an unintentional potential-touch event, as the touch of the touch interface was not intended to communicate via the touch interface. Classifying touch-interface events as touch and potential-touch events can make touch interfaces easier and more reliable to use.

To distinguish between touch and potential-touch events, the computer can analyze a "signature" associated with an event. An example signature for a capacitive touch interface can include one or more touch interface measurements associated with the event, e.g., (i) the magnitude of the change in capacitance associated with the event, (ii) the area of the change in capacitance associated with the event, and/or (iii) the location (or region of the touch interface) of the change in the capacitance associated with the event. Similar signatures can be used for other technologies.

After obtaining a particular signature for a first event, the computer can assign a confidence value to a classification of the particular signature. The confidence value can indicate how reliably that an event with the particular signature is properly classified as a touch event or a potential-touch event. For example, confidence values can be represented by numerical values that range from −1 to indicate a potential-touch event to +1 to indicate a touch event (or vice versa), where the absolute value of the confidence value indicates how reliably the event is properly classified with 0 for a wholly unreliable classification to 1 for a wholly reliable classification, and where the sign distinguishes between potential-touch events (with negative values in this example), and touch events (with positive values).

Classifications of touch events can change based on later touch events. For example, suppose the wearable computer classifies a first event as a potential-touch event based on the particular signature. Continuing this example, a second event occurs shortly after the first event and is classified a touch event. Then, the wearable computer can infer that the first event should have been characterized as a touch event rather than a potential-touch event. As a result, the computer may reduce the confidence value for the potential-touch event associated with the particular signature.

Similarly, if the computer characterizes the first event as a potential-touch event based on the first event's signature, and then the computer does not register a subsequent touch event very close in time after characterizing the first event, then the computer might conclude that it correctly characterized the first event as a potential-touch event. As a result, the computer may increase the confidence value associated with the signature corresponding to the first event.

Classifications of touch events can change based on contextual information beyond touch events as well, such as time, sensor readings, and other data. For example, the computer can have a number of sensors and corresponding rules to determine confidence values and/or classify touches based on data related to the day of the week, the time of day, an accelerometer reading, a light sensor reading, a biological input (pulse, temperature), etc. to determine whether to characterize an event as a touch event or a potential-touch event. In some embodiments, contextual information solely includes information other than touch-related information; e.g., information other than touch events, touch-event classifications, touch-event confidence values, touch signatures, and additional touch-related information.

A signature that might ordinarily be characterized as a touch event might instead be treated as a potential-touch event if contextual information suggests that a user would not be intending to touch the touch interface, e.g., time of day is the middle of the night on a weeknight, no light reaches a light sensor, snoring sounds are received by a microphone, and biological inputs (such as pulse and body temperature) suggest that a person associated with the computer is asleep.

As another example, using contextual information such as pulse rate, breathing rate, air temperature, etc., the wearable device can determine if the person is or is not wearing a wearable device acting as the computer. If the person is not wearing the wearable device, it is more likely that a touch event reflects a potential-touch event, such as a person brushing against the wearable device sitting on a table or while putting on the wearable device.

System and Device Architecture

FIG. 1 illustrates an example system 100 for receiving, transmitting, and displaying data. The system 100 is shown in the form of a wearable computing device. While FIG. 1 illustrates eyeglasses 102 as an example of a wearable computing device, other types of wearable computing devices could additionally or alternatively be used.

As illustrated in FIG. 1, the eyeglasses 102 comprise frame elements including lens-frames 104 and 106 and a center frame support 108, lens elements 110 and 112, and extending side-arms 114 and 116. The center frame support 108 and the extending side-arms 114 and 116 are configured to secure the eyeglasses 102 to a user's face via a user's nose and ears, respectively. Each of the frame elements 104, 106, and 108 and the extending side-arms 114 and 116 may be formed of a solid structure of plastic or metal, or may be formed of a hollow structure of similar material so as to allow wiring and component interconnects to be internally routed through the eyeglasses 102. Each of the lens elements 110 and 112 may include a material on which an image or graphic can be displayed. Each of the lens elements 110 and 112 may also be sufficiently transparent to allow a user to see through the lens element. These two features of the lens elements could be combined; for example, to provide an augmented reality or heads-up display where the projected image or graphic can be superimposed over or provided in conjunction with a real-world view as perceived by the user through the lens elements.

The extending side-arms 114 and 116 are each projections that extend away from the frame elements 104 and 106, respectively, and can be positioned behind a user's ears to secure the eyeglasses 102 to the user. The extending side-arms 114 and 116 may further secure the eyeglasses 102 to the user by extending around a rear portion of the user's head. Additionally or alternatively, the system 100 may be connected to or be integral to a head-mounted helmet structure. Other possibilities exist as well.

The system 100 may also include an on-board computing system 118, a video camera 120, a sensor 122, and finger-operable touch pads 124, 126. The on-board computing system 118 is shown to be positioned on the extending side-arm 114 of the eyeglasses 102; however, the on-board computing system 118 may be provided on other parts of the eyeglasses 102. The on-board computing system 118 may include a processor and memory, for example. The on-board computing system 118 may be configured to receive and analyze data from sensor 122, video camera 120 and finger-operable touch pads 124, 126 (and possibly from other sensory devices, user interfaces, or both) and generate images for output to the lens elements 110 and 112. In some embodiments, touch pads 124 and/or 126 can be configured to process handwriting inputs.

The video camera 120 is shown to be positioned on the extending side-arm 114 of the eyeglasses 102; however, the video camera 120 may be provided on other parts of the eyeglasses 102. The video camera 120 may be configured to capture images at various resolutions or at different frame rates. Many video cameras with a small form-factor, such as those used in cell phones or webcams, for example, may be incorporated into an example of the system 100. Although FIG. 1 illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown mounted on the extending side-arm 116 of the eyeglasses 102; however, the sensor 122 may be provided on other parts of the eyeglasses 102. The sensor 122 may include one or more motion sensors, such as a gyroscope and/or an accelerometer, clocks, sensors for generating biological information such as pulse-rate and breathing-rate sensors, and/or temperature sensors. Other sensing devices may be included within the sensor 122 and other sensing functions may be performed by the sensor 122.

The finger-operable touch pads 124, 126 are shown mounted on the extending side-arms 114, 116 of the eyeglasses 102. Each of finger-operable touch pads 124, 126 may be used by a user to input commands. The finger-operable touch pads 124, 126 may sense at least one of a position and a movement of a finger via capacitive sensing, resistance sensing, infrared sensing, or a surface acoustic wave process, among other possibilities. The finger-operable touch pads 124, 126 may be capable of sensing finger movement in a direction parallel to the pad surface, in a direction normal to the pad surface, or both, and may also be capable of sensing a level of pressure applied. The finger-operable touch pads 124, 126 may be formed of one or more translucent or transparent insulating layers and one or more translucent or transparent conducting layers. Edges of the finger-operable touch pads 124, 126 may be formed to have a raised, indented, or roughened surface, so as to provide tactile feedback to a user when the user's finger reaches the edge of the finger-operable touch pads 124, 126. Each of the finger-operable touch pads 124, 126 may be operated independently, and may provide a different function. Additional information about touch interfaces, such as touch pads 124, 126, is discussed below in the context of at least FIGS. 5A-9.

Figure 2:
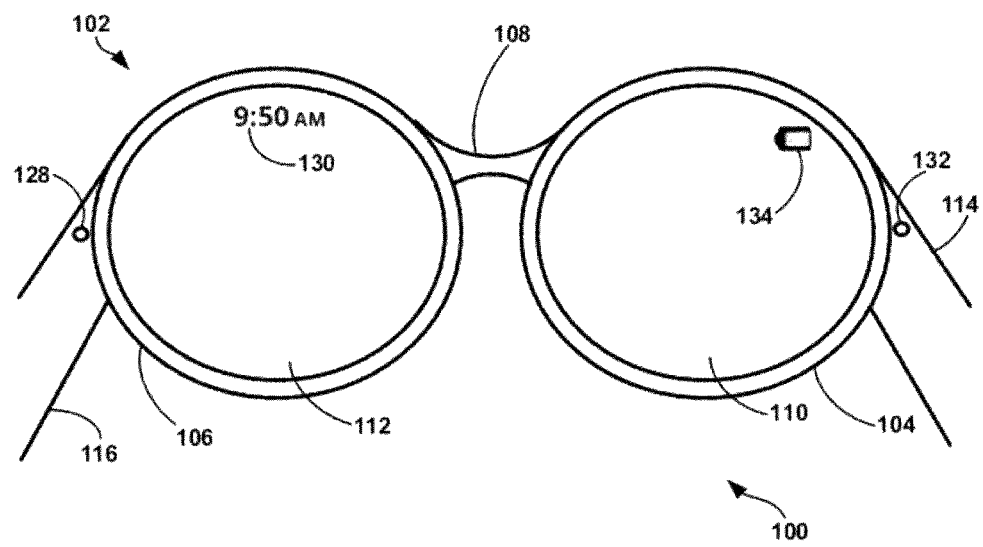
FIG. 2 is a second view of the example system of FIG. 1, in accordance with an example embodiment.

FIG. 2 illustrates another view of the system 100 of FIG. 1. As shown in FIG. 2, the lens elements 110 and 112 may act as display elements. The eyeglasses 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110 and 112 may act as a combiner in a light projection system and may include a coating that reflects the light projected onto them from the projectors 128 and 132. In some embodiments, a special coating may be omitted (e.g., when the projectors 128 and 132 are scanning laser devices).

In alternative embodiments, other types of display elements may also be used. For example, the lens elements 110, 112 themselves may include: a transparent or semi-transparent matrix display, such as an electroluminescent display or a liquid crystal display; one or more waveguides for delivering an image to the user's eyes; and/or other optical elements capable of delivering an in focus near-to-eye image to the user. A corresponding display driver may be disposed within the frame elements 104 and 106 for driving such a matrix display. Alternatively or additionally, a scanning laser device, such as low-power laser or LED source and accompanying scanning system, can draw a raster display directly onto the retina of one or more of the user's eyes. The user can then perceive the raster display based on the light reaching the retina.

In other embodiments (not shown in FIGS. 1 and 2), system 100 can be configured for audio output. For example, system 100 can be equipped with speaker(s), earphone(s), and/or earphone jack(s). In these embodiments, audio output can be provided via the speaker(s), earphone(s), and/or earphone jack(s). Other possibilities exist as well.

Figure 3:
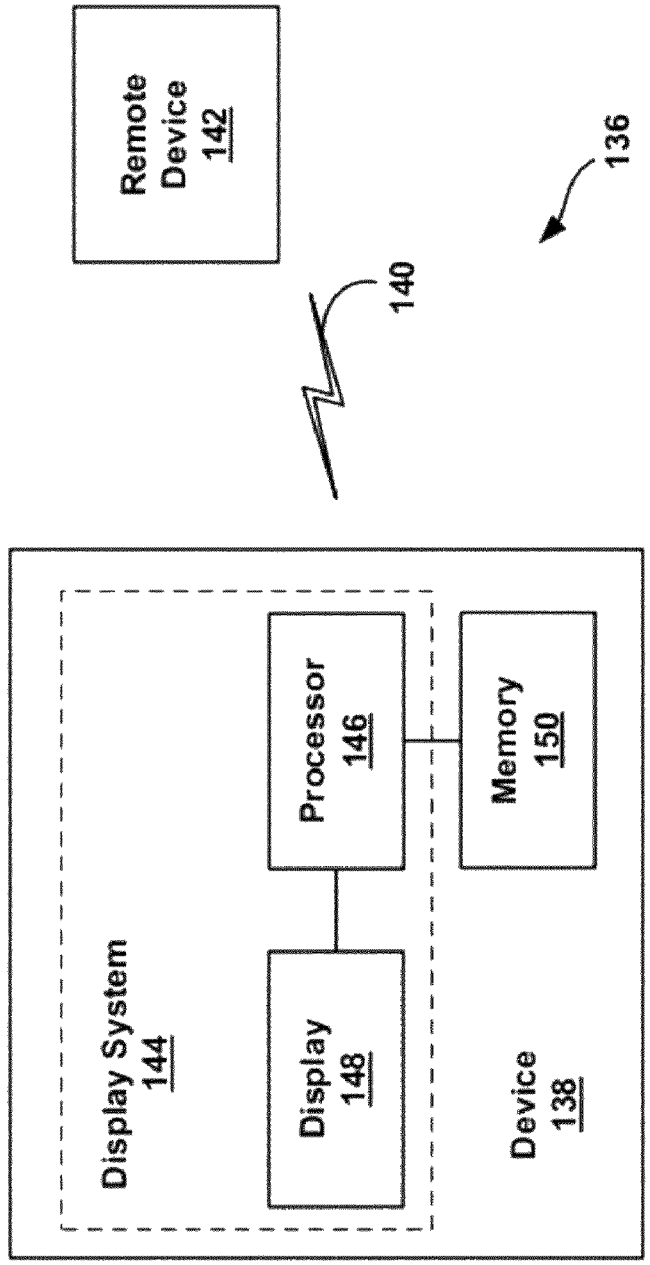
FIG. 3 is an example schematic drawing of computer network infrastructure, in accordance with an example embodiment.

FIG. 3 is a schematic drawing of a system 136 illustrating an example computer network infrastructure. In system 136, a device 138 communicates using a communication link 140 (e.g., a wired or wireless connection) to a remote device 142. The device 138 may be any type of device that can receive data and display information corresponding to or associated with the data. For example, the device 138 may be a heads-up display system, such as the eyeglasses 102 described with reference to FIGS. 1 and 2.

Thus, the device 138 may include a display system 144 comprising a processor 146 and a display 148. The display 148 may be, for example, an optical see-through display, an optical see-around display, or a video see-through display. The processor 146 may receive data from the remote device 142, and configure the data for display on the display 148. The processor 146 may be any type of processor, such as a micro-processor or a digital signal processor, for example.

The device 138 may further include on-board data storage, such as memory 150 shown coupled to the processor 146 in FIG. 3. The memory 150 may store software and/or data that can be accessed and executed by the processor 146, for example.

The remote device 142 may be any type of computing device or transmitter including a laptop computer, a mobile telephone, etc., that is configured to transmit data to the device 138. The remote device 142 and the device 138 may contain hardware to enable the communication link 140, such as processors, transmitters, receivers, antennas, etc.

In FIG. 3, the communication link 140 is illustrated as a wireless connection. The wireless connection could use, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Alternatively or additionally, wired connections may be used. For example, the communication link 140 may be a wired link via a serial bus such as a universal serial bus or a parallel bus. A wired connection may be a proprietary connection as well. The remote device 142 may be accessible via the Internet and may comprise a computing cluster associated with a particular web service (e.g., social-networking, photo sharing, address book, etc.).

Example Wearable Computing System

Figure 4:
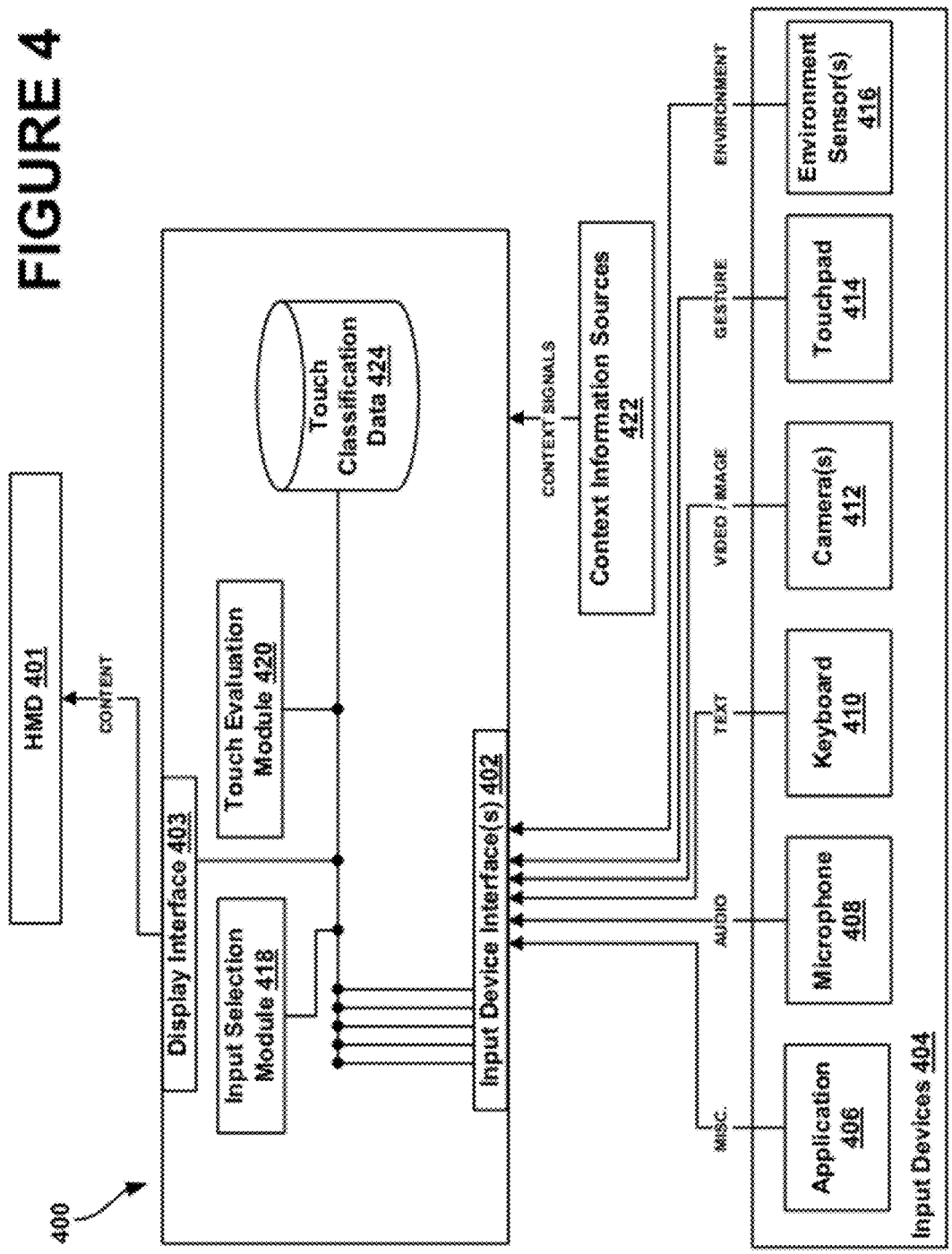
FIG. 4 is a functional block diagram for a wearable computing system, in accordance with an example embodiment.

FIG. 4 is a functional block diagram for a wearable computing system 400 in accordance with an example embodiment. System 400 is configured to monitor incoming data from a number of input devices 404 and display information related to the incoming data on Head Mounted Display (HMD) 401. For example, system 400 can determine touch events have occurred at touchpad 414 and, perhaps, responsively change one or more operations of system 400 based on the touch event(s). Accordingly, system 400 can be configured to detect instructions associated with touch events, and to responsively initiate the actions specified in the instructions.

Example Input Devices

As shown in FIG. 4, system 400 includes one or more input-device interfaces 402 for receiving data from input devices 404 and one or more output devices, such as HMD 401, for presenting information related to the data from input devices. In the illustrated embodiment, the input devices 404 include, for example, an application 406, a microphone 408, a keyboard 410, a camera 412, a touchpad 414, and environment sensor(s) 416. A given input-device interface 402 may be configured to interface with and receive data from a single input device, such as touchpad 414. Alternatively, a given input-device interface 402 may be configured to simultaneously interface with multiple input devices, such as some or all of input devices 406-416.

System 400 can receive a number of different types of input data from input devices 404. In the illustrated embodiment, system 400 may receive, for example, audio data from microphone 408, text data from keypad 410, video data and/or image data from camera(s) 412, touch events from touchpad 414, and environmental/contextual information from environmental sensor(s) 416. In some scenarios, multiple inputs can be received simultaneously. System 400 may be configured to receive other modalities of data, in addition or in the alternative to those described, without departing from the scope of the invention.

In some embodiments, some or all types of input data can be converted to text. For some types of input data, such as input data from keyboard 410 and touchpad 414, little or no conversion may be needed. For other types of input, conversion modules, such as a speech-to-text module and/or a video-to-text module (not shown in FIG. 4), can be used to convert input data to text. Applications, such as application 406, may generate text, audio input, video input, and/or other types of input (e.g., encrypted input, compressed input, other types of binary input, etc.). Thus, application-specific techniques can be used generate input text from inputs derived from application 406.

Environmental sensor(s) 416 can utilize one or more technologies and sensors to determine and provide information about an environment associated with system 400. Environmental sensor(s) 416 can include clocks to determine time/date information, light sensors for various wavelengths (e.g., infrared, visible, ultraviolet), location sensors to provide location information about system 400, temperature sensors (e.g., thermometers), biological-information sensors, and/or additional sensors.

Example location-sensor technologies include, but are not limited to, Global Positioning System (GPS) technologies and sensors, other satellite-based technologies and sensors, inertial navigation technologies, timing circuitry, accelerometers, compasses, velocity sensors, and gyroscopes. In some embodiments, environmental sensor(s) 416 can determine and provide location-related information to system 400, such as velocity including both speed and direction(s) of travel, acceleration, distance(s) traveled, and timing information. Many other types of location-related information are possible as well.

Example biological-information sensors include heart-rate sensors, pulse-rate sensors, thermometers, breathing-rate sensors, and skin conductance sensors. Many other biological-information sensors are possible as well.

Other input devices not shown in FIG. 4 can be utilized as well. For example, sensors, scanners, additional pads configured for touch and/or handwriting input, optical character recognition (OCR) related devices such as scanners, and various other devices can be used as input sources to system 400. In some embodiments, system 400 can be configured with one or more input and/or output ports or jacks configured for communicating with input and/or output devices.

Selection Criteria for Input Content

In the illustrated embodiment, system 400 includes an input selection module 418, which generally functions to evaluate the input data from the various input devices 404. In particular, input selection module 418 may be configured to receive input data from the input devices 404 via input device interfaces 402 and detect one or more data patterns in the input data.

In some cases, input selection module 418 may detect multiple concurrent data patterns in the input data. For example, input selection module 418 may detect a first data pattern in data from a first source and, simultaneously, detect a second data pattern in data from a second source. As such, touch classification data 424 can include input-selection rules that prioritize certain data patterns and/or certain input devices. For instance, touch classification data 424 may prioritize detection of touch events via touchpad 414 over video data from camera 412. Touch classification data 424 can include classification-resolution rules to resolve conflicts in data used to determine confidence values and/or classifications of signatures as touch events or potential-touch events. For example, if temperature data indicates that an event should be classified with classification C, while biological data indicates that the event should be classified with classification C', then one or more classification-resolution rules can be used to resolve the conflict between the indications.

It should be understood touch classification data 424 may specify other hierarchies and/or other prioritizations of input devices and/or data patterns, without departing from the scope of the invention. Thus, touch classification data 424 may be based on one or more objectives in a specific implementation.

In another aspect, the touch classification data 424 can indicate that inputs are to be processed by touch evaluation module 420. Touch evaluation module 420 can be configured to receive touch events from touchpad 414 (or perhaps other touch interfaces), determine corresponding signatures for the touch events, classify touch events at least as touch or potential-touch events, and determine and adjust confidence values for classifications of touch events. In some embodiments, touch evaluation module 420 can be configured to communicate touch-event classifications and/or confidence values, perhaps using communication link 140.

Touch evaluation module 420 can use input from input devices 404, touch classification data 424, and other information to determine signatures, classifications, and confidence values for touch events. In particular, touch evaluation module 420 can utilize additional contextual information stored with touch classification data 424, to determine signatures, classifications, and confidence values for touch events. The additional contextual information can include historical and preference information about touch events, information about touch interfaces and/or environmental sensor data that can affect signatures, classifications, and/or confidence values.

In some embodiments, part or all of the functionality of one or more of the herein-described modules 418 and 420, and touch classification data 424 can be combined. For example, the part or all of the functionality of touch classification data 424 can be combined with touch evaluation module 420 (or vice versa).

Prompts, corrections, and/or text segments can be displayed using HMD 401 and/or on another display device (not shown in FIG. 4). In embodiments not depicted in FIG. 4, output can be provided to other devices than HMD 401; for example, output can be communicated via communication link 140. As another example, if system 400 is equipped with speaker(s), earphone(s), and/or earphone jack(s), audio output can be provided via the speaker(s), earphone(s), and/or earphone jack(s). Many other examples and/or outputs are possible as well.

System 400 may also be configured to acquire context signals from various data sources. For example, context information sources 422 can be configured to derive information from network-based weather-report feeds, news feeds and/or financial-market feeds, and/or a system clock providing a reference for time-based context signals. As such, context information sources 422 can augment and/or replace functionality of environment sensor(s) 416—for example, data about ambient air temperature received via context information source 422 can replace or augment data from a temperature sensor of environment sensor(s) 416. As another example, various environmental data can determine a location for the context using environment sensor(s) 416.

Example Use Scenarios for a Touch Interface

Figure 5A:
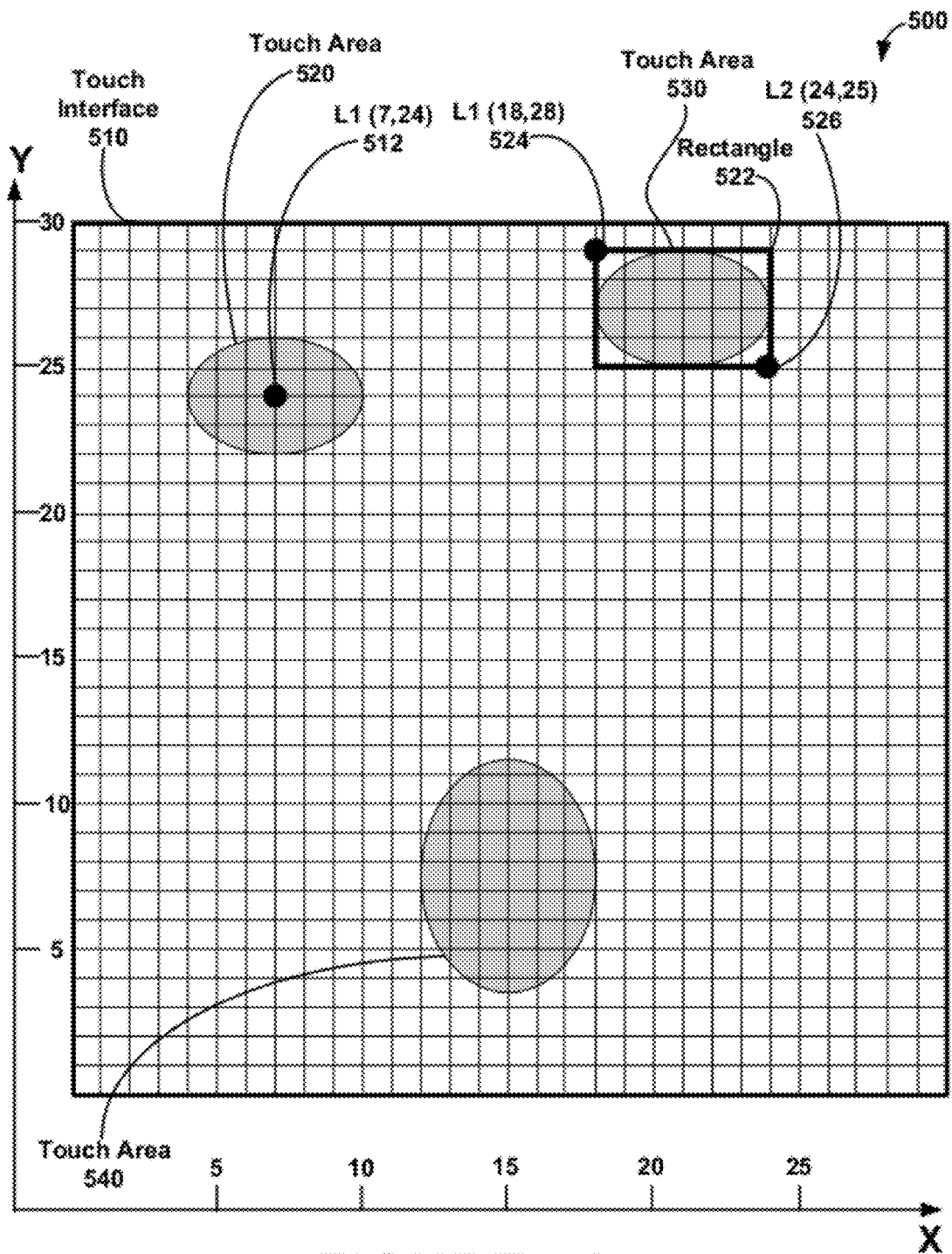
FIGS. 5A and 5B depict an example use scenario for a touch interface, in accordance with an example embodiment.
Figure 5B:
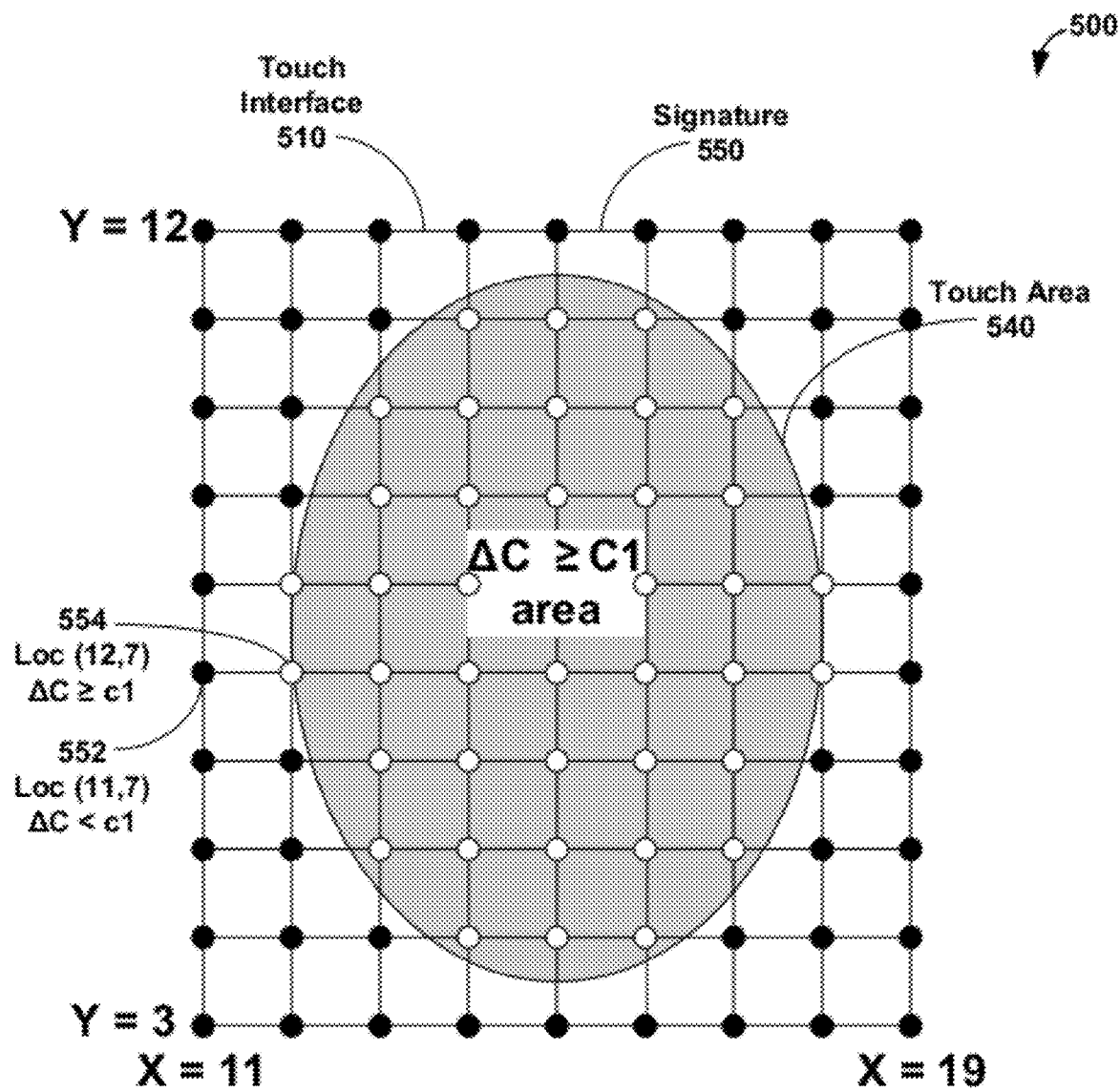

FIGS. 5A and 5B depict an example use scenario 500 for a touch interface 510, in accordance with an example embodiment. For example, a touch pad 124,126 of system 100 or touch pad 414 of system 400 could act as touch interface 510.

Example touch interface 510 is shown as a 30×30 grid in FIG. 5A to locate touches along the surface of touch interface 510. In other embodiments, grids of different sizes than disclosed herein can be used by touch interface 510. FIG. 5A shows X grid values from 0 on the left to 30 on the right side of touch interface 510, and shows Y grid from 0 at the bottom to 30 at the top of touch interface 510.

In scenario 500, FIG. 5A shows three touch areas 520, 530, and 540 on touch interface 510. Each of touch areas 520, 530, and 540 indicate an area where touch interface 510 is in contact with (a.k.a. touches) an entity, such as a finger of a user, stylus, or other object, that is separate from touch interface 510.

Touch interface 510 can determine that a touch area is in contact with the entity based on a change in touch interface 510. In scenario 500, touch interface 510 is a capacitive touch interface. As touch interface 510 is a capacitive touch interface, touch interface 510 can detect one or more changes in capacitance at each of touch areas 520, 530, and 540. Depending on the technology or technologies used to implement touch interface 510, the change can be a change in electrical resistance (for resistive touch interfaces), a change in electrical capacitance (for capacitive touch interfaces), a change in one or more ultrasonic waves (for surface acoustic wave touch interfaces), a change in one or more light beams (for infrared and optical imaging touch interfaces), and/or a change in mechanical energy (for acoustic pulse recognition and dispersive signal touch interfaces). Other technologies for implementing touch interface 510 are possible as well.

Locations of touch areas 520, 530, and 540 can be specified using various techniques. FIG. 5A shows touch area 520 located with one location (L1) 522 at the center of this touch area, which is at grid location (7, 24). A location of touch area 530 is specified using a bounding rectangle technique. The bounding rectangle technique uses two points to specify opposite corners of a rectangle that encloses an area of interest, such as touch are 530. FIG. 5A shows bounding rectangle 532 with upper left hand corner location L1 534 at grid location (18, 28) and lower right hand corner location L2 536 at grid location (24, 25).

FIG. 5B shows an expanded view of touch interface 510 in scenario 500 near touch area 540. In particular, FIG. 5B shows a rectangular section of touch interface 510 between grid locations (11, 3) in the lower left hand corner and (19, 12) in the upper right hand corner.

The expanded view shown in FIG. 5B depicts a signature 550 of touch area 540. FIG. 5B shows each integer grid location of with a small circle that is colored either black or white. A black circle at grid location $(X_{lo}, Y_{lo})$ indicate that a change in capacitance, $\Delta C$, is less than a threshold value, C1, at $(X_{lo}, Y_{lo})$, while a white circle at grid location $(X_{hi}, Y_{hi})$ indicates that $\Delta C$ is greater than or equal to C1 at $(X_{hi}, Y_{hi})$. For example, at location 552 with grid location (11, 7), $\Delta C$ is less than C1, and is depicted with a black dot; while at location 553 with grid location (12, 7) $\Delta C$ is greater than or equal to C1, and is depicted with a white dot.

One possible implementation of signature 550 would be to encode each black dot at a "0" and each white dot as a "1" (or vice versa) throughout touch interface 510. Thus, each touch area could be located as a two-dimension pattern of 1's in signature 550. Another possible implementation would be to maintain a list or similar data structure of the position(s) or ranges of positions on touch interface 510 where $\Delta C$ is greater than or equal to C1 (e.g., the 1's positions). For example, an example list of X ranges of positions corresponding to the 1's positions of FIG. 5B (going from top to bottom of FIG. 5) is: Y=11, X=14-16; Y=10, X=13-17; Y=9, X=13-17; Y=8, X=12-18; Y=7, X=12-18; Y=6, X=13-17; Y=5, X=13-17; Y=4, X=14-16.

Analysis of signature 550 could lead to a confidence value and/or classification of touch area 540. For example, as the white dots in signature 550 have a roughly oval shape, such as the shape of a finger print, could indicate a higher confidence value that touch area 540 corresponds to an actual touch, in comparison with another shape, such as a random pattern of 1's.

The height, width, and/or area of signature 550 can be used to classify touch area 540. If the height, width, and/or area of signature 550 are significantly larger or smaller than known values of actual touches, then the confidence value that touch area 540 corresponds to an actual touch can be decreased. Actual touch data, such as height, width, and/or areas of actual touches and/or ranges of these data can be stored as part of touch classification data 424.

When confidence values for an event are changed, the confidence values can be re-examined to verify the classification of the event as touch event or potential-touch event. For example, the confidence value can be represented by numerical values that range from −1 to indicate a potential-touch event to +1 to indicate a touch event (or vice versa), where the absolute value of the confidence value indicates how reliably the event is properly classified with 0 for a wholly unreliable classification to 1 for a wholly reliable classification, and where the sign distinguishes between potential-touch events (with negative values in this example), and touch events (with positive values).

Using this representation of confidence values, suppose a confidence value is initially −0.1 for an event and is increased by +0.3 based on later contextual data, to an increased confidence level of +0.2. Correspondingly, the initial classification of the event would be a potential-touch event, and the classification would change, based on the later contextual data, to be classified as a touch event.

As another example, suppose a confidence value is initially +0.4 for an event and is decreased by 1.0 based on later contextual data, to a decreased confidence level of −0.6. Correspondingly, the initial classification of the event would be a touch event, and the classification would change, based on the later contextual data, to be classified as an potential-touch event. Many other examples of changing confidence values, including many examples where classifications of events do not change after confidence values change, are possible as well.

In some scenarios, values for capacitance values (the ΔC's) can be stored by system 400 as part of signature 550. In those cases, these values can be used to estimate the amount of force used to generate touch area 540, as the ΔC value is based on this amount of force. In particular embodiments, such as shown in FIG. 5B, the ΔC values are compared to a threshold, C1, that indicates a minimum amount of change in capacitance and so, should correspond to a minimum amount of force, required to activate touch interface 510 to register a touch. By comparing the actual ΔC values to the threshold C1, very light touches (e.g., when the touch interface is brushed by a piece of cloth, such as a sleeve) can be filtered out to simplify data analysis.

Figure 6A:
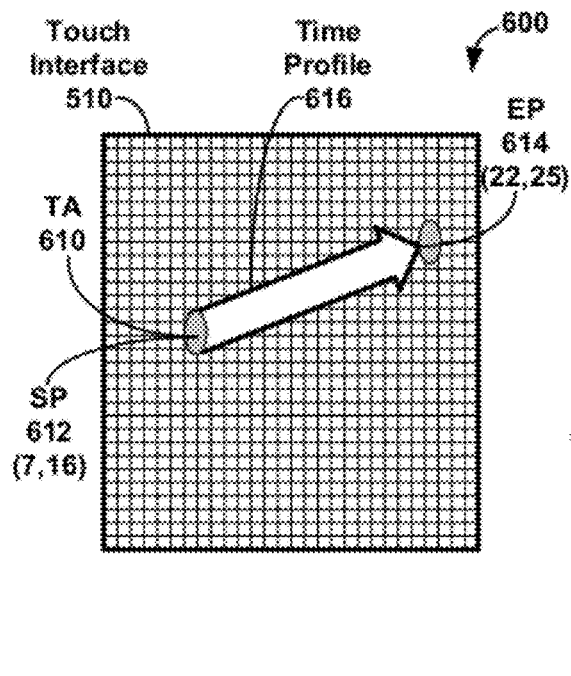
FIGS. 6A, 6B, 6C, and 6D depict additional example use scenarios for a touch interface, in accordance with an example embodiment.
Figure 6B:
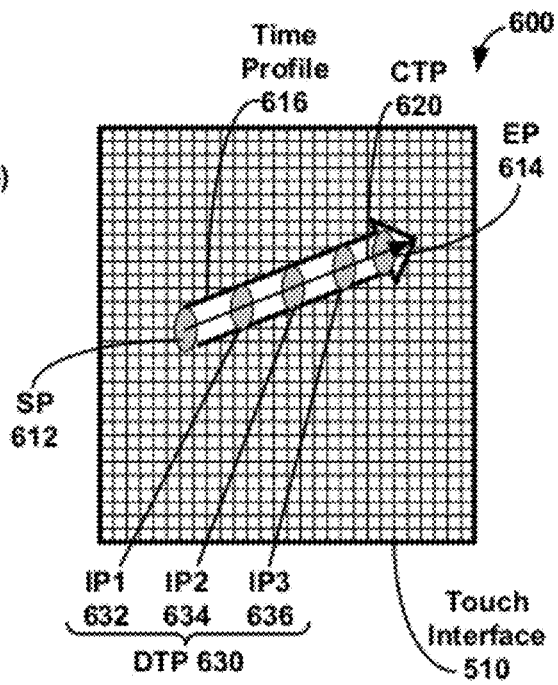

FIGS. 6A, 6B, 6C, and 6D depict additional example use scenarios for a touch interface, in accordance with an example embodiment. FIGS. 6A and 6B each depict a scenario 600 indicate a "time profile" 616 of a touch area 610 from starting position SP 612 at approximate grid position (7,16) to ending position EP 614 at approximate grid position (22,25) of touch interface 510.

Time profile 616 can begin, in time, when an initial touch is detected. In scenario 600, the initial touch is detected at starting position 612. Time profile 616 can end when the initial touch is no longer detected. In scenario 600, the initial touch is no longer detected by touch interface 510 at ending position 614.

In some scenarios, time profile 616 can end when the initial touch stays in one place; e.g., the initial touch is not detected as moving more than a predetermined distance during a predetermined time interval. For example, suppose a user of touch interface 510 moved their finger to contact touch interface at starting position 612 and quickly moved their finger to ending position 614 and then let their finger rest at ending position 614. In this case, the finger would not move more than the predetermined distance during the predetermined time interval, and so time profile 616 can end shortly after the finger stopped at ending position 614, even if the finger stays at ending position 614.

FIG. 6B shows two example techniques for processing time profile 616. FIG. 6B shows continuous time profile (CTP) 620 as an arrow in the middle of time profile 616. Continuous time profile 620 can include storing the starting position SP 612, the ending position EP 614 and perhaps an amount of time elapsed between detecting a touch at starting position 612. In some embodiments, continuous time profile 620 can include a signature of a touch, such as the touch at starting position 612 or a touch at ending position 614.

A second technique is to process a discrete time profile (DTP) 630 of time profile 616. Discrete time profile 630 can store signatures and/or other data related to the touches gathered at various times and positions along time profile 616. For example, as shown in FIG. 6B, discrete time profile 630 include signatures and/or other data at a first intermediate position 632, at a second intermediate position 634, and at a third intermediate position 636. Discrete time profile can also include signatures and/or other data at starting position 612 and ending position 614.

A continuous time profile can be derived from a discrete time profile by analyzing patterns of the data stored at various times/positions in the discrete time profile. For example, if signatures of touches are stored at various points along the time profile, the centers of areas with capacitance changes could be determined, and used to determine a path corresponding to the time profile. In particular, the time profile data at the starting and ending positions can be used to provide a linear approximation of time profile 615.

Figure 6C:
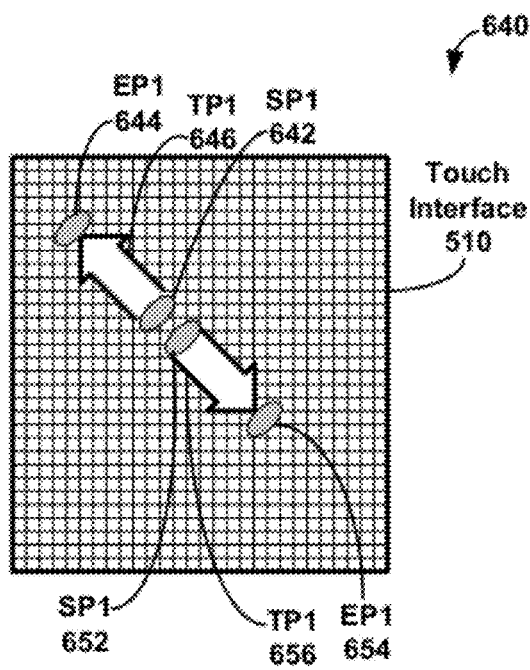

FIG. 6C depicts a scenario 640 with two simultaneous time profiles: time profile 1 (TP1) 646 and time profile 2 (TP2) 656. During scenario 640, a user moves a first finger from a first-finger starting position (SP1) 642 to a first-finger ending position (EP1) 644, and moves a second finger from a second-finger starting position (SP2) 652 to a second-finger ending position 2 (EP2) 654, thereby generating time profiles 646 and 656.

System 400 can infer that a gesture has been made when multiple time profiles are generated simultaneously. For example, based on time profiles 646 and 656, system 400 can infer that a user meant to make an "expand" gesture by moving two fingers away from each other simultaneously, as the directions of time profiles 646 and 656 are generally away from each other. In response to the expand gesture, system 400 can zoom in on a view of information being displayed and provide a closer view of the displayed information. Similarly, if the directions of time profiles 646 and 656 were both reversed to point at each other, system 400 could infer a "shrink" gesture was made. In response to the shrink gesture, system 400 can zoom out on a view of information being displayed and provide a wider view of the displayed information. Many other examples are possible as well.

Figure 6D:
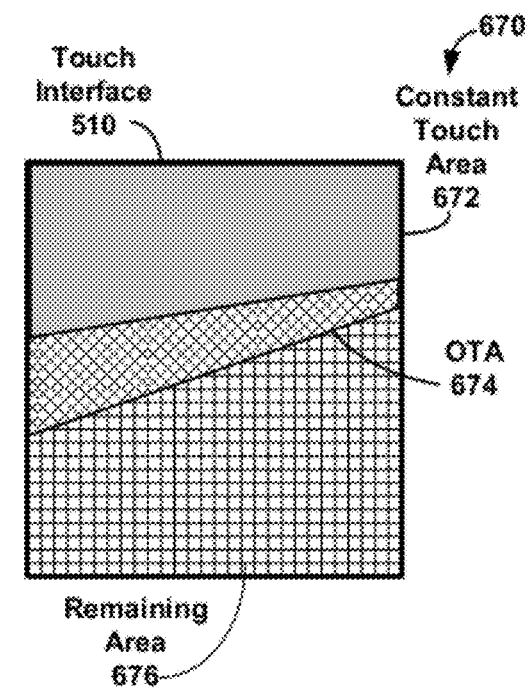

FIG. 6D depicts a scenario 670 where the time profile for touch interface 510 shows a constant touch area 672, an occasional touch area (OTA) 674, and a remaining area 676. For example, if system 400 with touch interface 510 were acting as a smart phone or other telephone device, and system 400 were being held close to a user's face during a phone call, a portion of touch interface 510 may come in constant or near-constant contact with the user's face. As the user talks during the phone call, another portion of touch interface 510 can have occasional contact with the user, while a third portion of the device may be constantly or nearly constantly held away from the user.

The resulting time pattern of this phone call example is depicted in FIG. 6D, with constant touch area 672 being in contact with the user's face (e.g., near or at the jawline), occasional touch area 674 being in occasional contact with the user's face as the device moves during a conversation, and remaining area 676 begin held away from contact with the user.

System 400 can infer, by examining a time profile with a large amount of area of touch interface 510 being touched constantly or nearly constantly over time, that touch interface 510 likely is not in use. Rather, system 400 can wait for constant touch area 672 to not be touched to infer that the user may want to use touch interface 510; e.g., by moving system 400 away from the user's face so touch interface 510 can be readily viewed.

In some examples not shown in FIGS. 6A-6D, time profiles can change directions one or more times; e.g., a time profile tracing the letter "V" would start with a downward partial path and end with an upward partial path. In these examples, a time profile can track changes in direction between partial paths of the time profile; for example, by storing each locations where movement along touch interface 510 changes; e.g., movement starts, stops, and/or changes direction. Then, by inferring straight-line movement between the locations of changing movement, the time profile can store an approximation of the partial paths taken during the time profile. Many other examples are possible as well.

Figure 7:
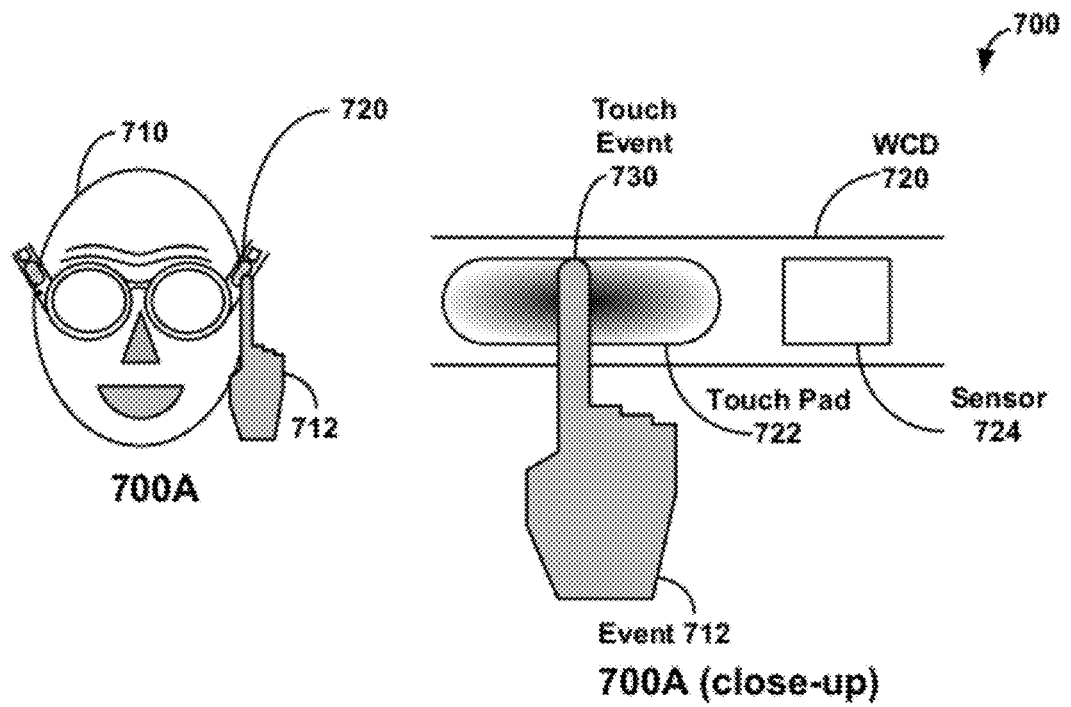
FIG. 7 depicts a use scenario of a touch interface and contextual information, in accordance with an example embodiment.
Figure 7:
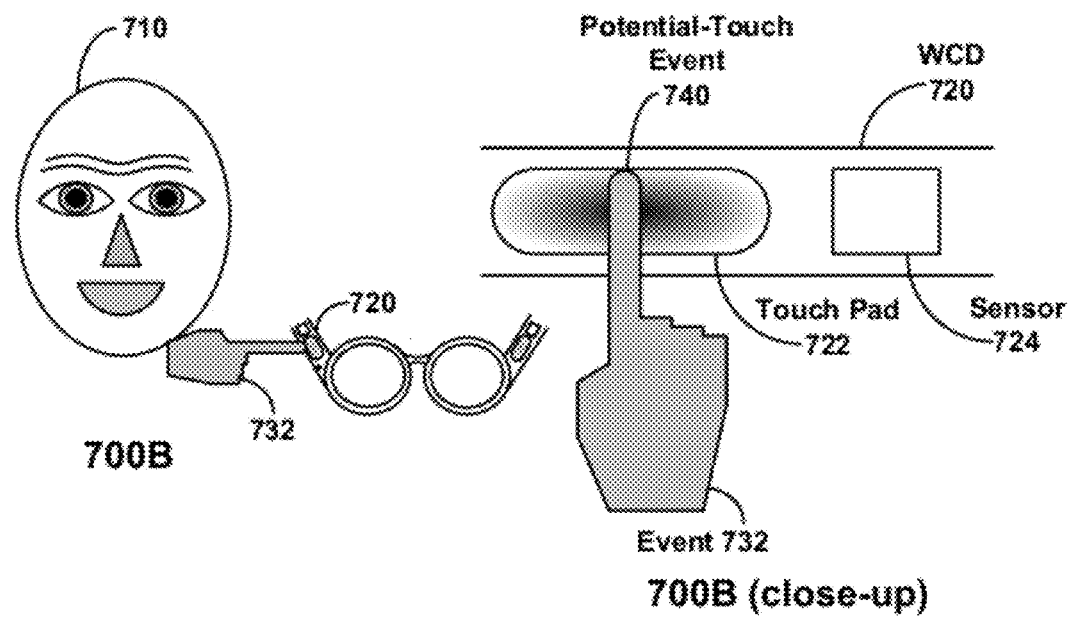

FIG. 7 depicts a use scenario 700 of a touch interface and contextual information, in accordance with an example embodiment. At 700A of FIG. 7, a wearer 710 of wearable computing device (WCD) 720, equipped with sensor 724, touches touch pad 722. For example, system 400 can act as wearable computing device 720, environment sensor(s) 416 can act as sensor 724, and touch interface 510 can act as touch pad 722.

In scenario 700, wearable computing device 720 is configured with sensor 724 that can detect at least a temperature T near touch pad 722 and thus of wearable computing device 720. For example, T can be a temperature of air surrounding sensor 724. Then, wearable computing device 720 can use sensor 724 to determine temperature T.

At 700A of FIG. 7, wearer 710 wears wearable computing device 720 and touches touch pad 722, which detects this touch as event 712. Wearable computing device 720 can determine a temperature T near touch pad 712 using sensor 724, compare T to a threshold temperature T1, and based on the comparison, determine whether or not wearable computing device 720 is being worn by wearer 710. For example, if T is less than T1, wearable computing device 720 can infer that wearable computing device 720 is likely not being worn by wearer 710.

On the other hand, if T is greater than or equal to T1, wearable computing device 720 can infer that wearable computing device 720 is more likely to be worn by wearer 710. Wearable computing device 720 also can infer that: (a) if wearable computing device 720 is likely not being worn, then touch pad 722 of wearable computing device 720 is less likely to be intended to be used and (b) if wearable computing device 720 is likely being worn, then touch pad 722 of wearable computing device 720 is more likely to be intended to be used.

At 700A of FIG. 7, T is greater than T1, and so wearable computing device 720 can infer that wearable computing device 720 may be worn by wearer 710. By inferring that the wearable computing device 720 is worn by wearer 710, wearable computing device 720 can further infer that touch pad 722 is likely intended for use, and thus increase the confidence value that event 712 should be classified at a touch event. FIG. 7 shows that, at 700A, wearable computing device has classified event 712 as touch event 730.

Continuing scenario 700, at 700B of FIG. 7, wearer 710 has taken off wearable computing device 720 and then touches touch pad 722, which detects this touch as event 732. In response to event 732, wearable computing device 720 can determine temperature T from sensor 724 and compare T to T1, as discussed above. At 700B of FIG. 7, temperature T recorded by sensor 724 is less than temperature T1. Thus, wearable computing device 720 infers that wearer 710 is not wearing wearable computing device 720, and therefore more likely to be unintentionally using touch pad 722. Based on these inferences, wearable computing device 720 can decrease the confidence value that touch 732 should be classified at a touch event. FIG. 7 shows that, at 700B, wearable computing device 720 classified event 732 as potential-touch event 740. Other scenarios for determining confidence values and/or classifications of touches based on wearer 710 wearing or not wearing wearable computing device 710 are possible as well.

Figure 8A:
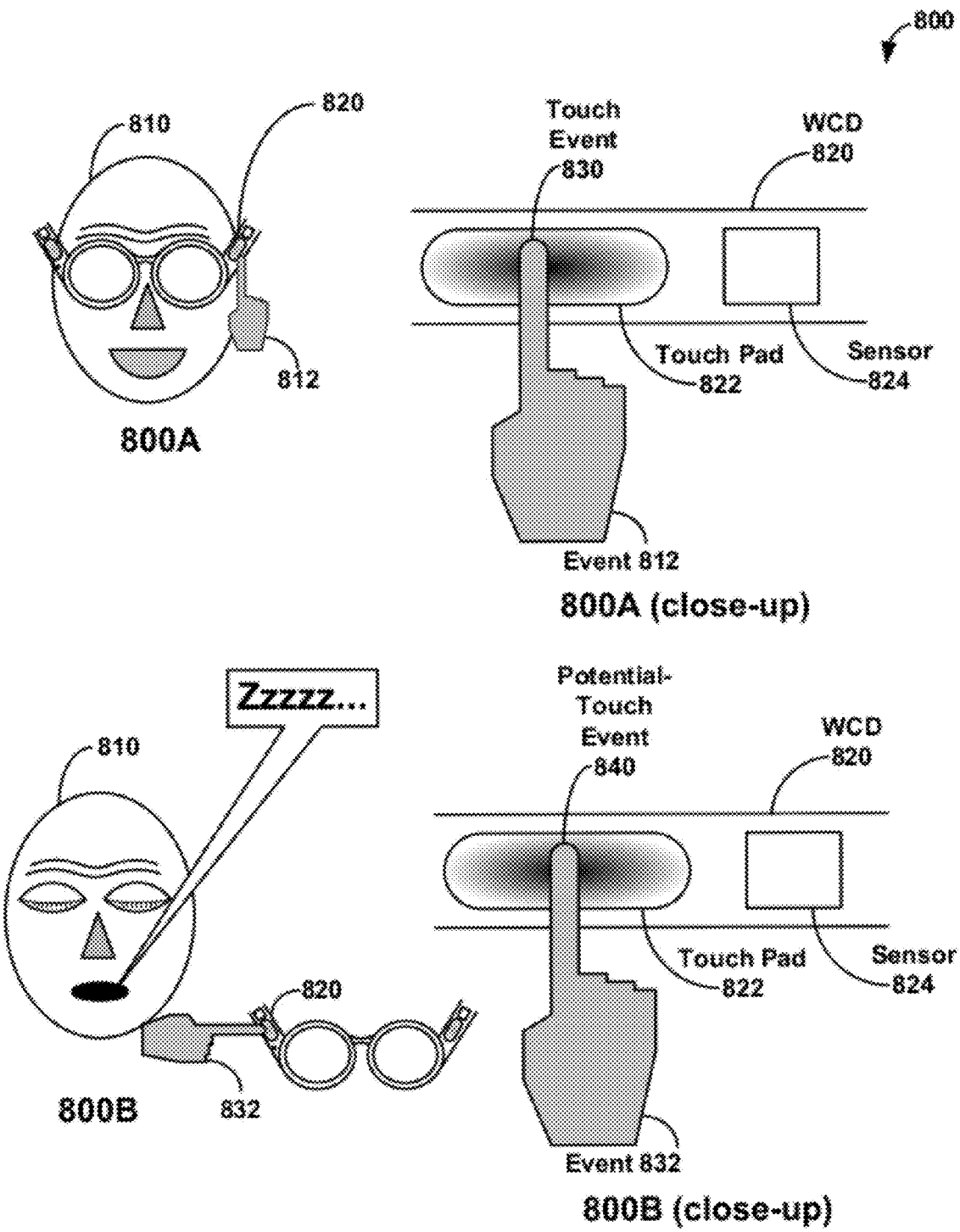
FIGS. 8A and 8B depicts a second use scenario of a touch interface and contextual information, in accordance with an example embodiment.

FIG. 8A depicts a second use scenario of a touch interface and contextual information, in accordance with an example embodiment. At 800A of FIG. 8, a wearer 810 wears wearable computing device (WCD) 820, equipped with sensor 824, and touches a touch pad 822 of the wearable computing device 820. For example, system 400 can act as wearable computing device 820, environment sensor(s) 416 can act as sensor 824, and touch interface 510 can act as touch pad 822.

In scenario 800, sensor 824 can detect at least biological information about wearer 810. For example, sensor 824 can include heart-rate sensors, pulse-rate sensors, thermometers, breathing-rate sensors, and/or skin conductance sensors, and provide biological information including a heart rate of wearer 810, a pulse rate of wearer 810, a breathing rate of wearer 810, and/or skin conductance values for wearer 810.

Wearable computing device 820 can use the biological information provided by sensor 824 to determine whether wearer 810 is wearing wearable computing device 820 or not and whether wearer 810 is awake or asleep. For example, if no biological information is detected by sensor 824; e.g., no heart rate, pulse rate, breathing rate, or skin information, then wearable computing device can infer that wearer 810 is not wearing wearable computing device 820. On the other hand, if biological information is being detected by sensor 824 and provided to wearable computing device 820, then wearable computing device can infer that wearer 810 is wearing wearable computing device 820.

When biological information is being detected by sensor 824 and provided to wearable computing device 820, then wearable computing device 820 can infer a state of wearer 810, such as whether or not wearer 810 is awake or asleep. For example, wearable computing device 820 can determine sleeping heart, pulse, and/or breathing rates, and waking heart, pulse, and/or breathing rates. Then, by comparing current heart, pulse, and/or breathing rates provided by sensor 824 with the corresponding sleeping and waking rates, wearable computing device 820 can determine if wearer 810 is awake or asleep. Some or all of the biological information, including current, sleeping, and waking rates, can be stored as part of touch classification data 424.

In some embodiments, biological information can be obtained by other sensors than sensor 824. For example, microphone 408 can detect sounds that can be used as biological information and/or to aid in determination that a user is awake or asleep and/or wearable computing device 810 is being worn or not. Examples of such sounds include, but are not limited to: breathing sounds, sleep-oriented sounds such as snoring sounds, awake-oriented sounds such as talking, and movement oriented sounds (e.g., sounds related to moving water and singing may indicate the wearer is currently awake and singing in the shower.) As another example, if camera 412 is oriented toward a face of wearer, images of eyes, eyelids, and eye movement can be processed and used as biological information and/or to aid in determination that a user is awake or asleep.

An initial determination of awake/asleep state can be correlated with information additional to the biological information to make a final determination of awake/asleep state. For example, wearable computing device 820 can use any available time-of-day information about sleeping habits for wearer 810; e.g., wearable computing device can have information that wearer 810 is more likely to be asleep between midnight and 8 AM, and more likely to be awake between 8 AM and midnight. The time of day information about sleeping habits for wearer 810 can be stored as part of touch classification data 424.

Other states of wearer 810 can be determined as well; for example, if heart, pulse, and/or breathing rates are relatively high and skin resistance is relatively low, wearable computing device 820 can infer wearer 810 is exercising. Again, touch classification data 424 can store data to determine additional states of wearer 810 based on biological information, such as exercising heart, breathing, pulse, and skin conductance values.

At 800A of FIG. 8A, wearer 810 touches touch pad 822, which detects this touch as event 812. Wearable computing device 820 can determine biological information using sensor 824. Using the techniques discussed immediately above, wearable computing device 820 can infer that wearer 810 is awake based on the biological information.

By inferring that wearer 810 is awake, wearable computing device 820 can further infer that touch pad 822 is intended for use, and thus increase the confidence value that event 812 should be classified at a touch event. FIG. 8A shows that, at block 800A, wearable computing device has classified event 812 as touch event 830.

Continuing scenario 800, at 800B of FIG. 8A, wearer 810 has taken off wearable computing device 820 and then touches touch pad 822, which detects this touch as event 832. In response to event 832, wearable computing device 720 can determine biological information from sensor 824 and then determine whether wearer 810 is awake or asleep, as discussed above. At 800B of FIG. 8, wearable computing device 810 determines that the biological information from sensor 824 indicates wearer 810 is asleep. Thus, wearable computing device 820 infers that wearer 810 is not intentionally using touch pad 822. Based on these inferences, wearable computing device 820 can decrease the confidence value that touch 832 should be classified as a touch event. FIG. 8A shows that, at 800B, wearable computing device 820 has classified touch 812 as potential-touch event 840. Other scenarios for determining confidence values and/or classifications of touches based on wearer 810 being awake or asleep are possible as well.

Figure 8B:
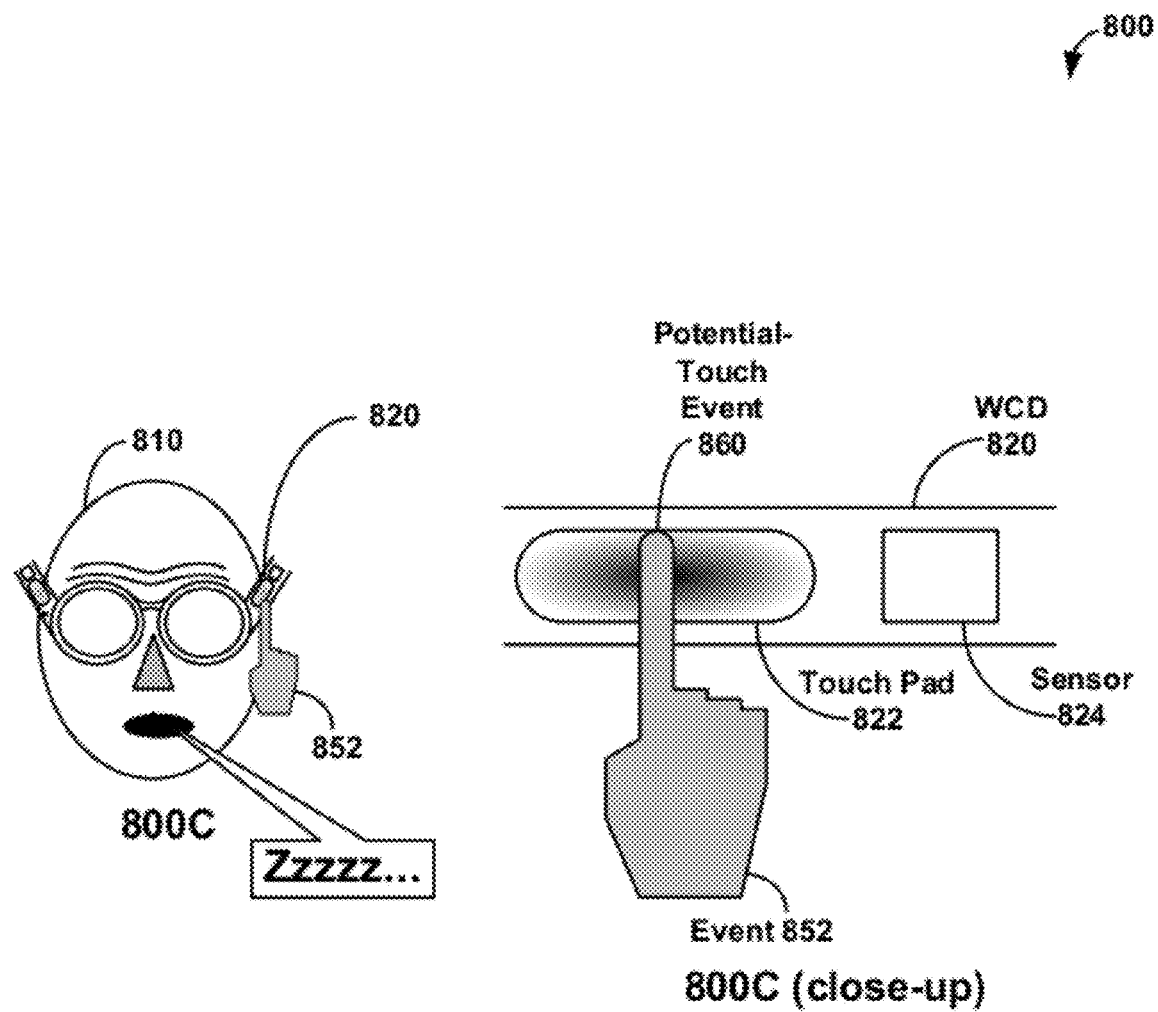

FIG. 8B continues scenario 800. At 800C of FIG. 8B, wearer 810 has fallen asleep while wearing wearable computing device 820. During sleep, wearer 810 touches 852 wearable computing device 820, which registers this touch as event 852.

Utilizing temperature data alone, such as discussed above in the context of FIG. 7, wearable computing device 820 could infer that wearable computing device 820 is being worn by wearer 810, which is correct. Then, as wearable computing device 820 is being worn, wearable computing device 820 could infer that event 852 is an intentional touch, which is likely to be incorrect.

However, in response to event 852, wearable computing device 720 can also or instead determine biological information from sensor 824 and to determine whether wearer 810 is asleep, as discussed above. At 800C of FIG. 8B, wearable computing device 810 determines that the biological information from sensor 824 indicates wearer 810 is asleep. Thus, wearable computing device 820 can infer that wearer 810 is not intentionally using touch pad 822.

To resolve these competing inferences based on temperature and biological data, wearable computing device 820 can have one or more classification-resolution rules, such as inferences regarding a state of wearer 810 (e.g., awake/asleep) more heavily than inferences based on temperature data when the inferences conflict. The classification-resolution rules can be stored in touch classification data 424.

Based on these inferences and classification-resolution rules, wearable computing device 820 can infer that (a) wearable computing device 820 is being worn while (b) wearer 810 is asleep, and thus (c) event 852 is more likely associated with an unintentional touch. Based on these inferences, wearable computing device 820 can decrease the confidence value that touch 852 should be classified at a touch event. FIG. 8A shows that, at 800C, wearable computing device 820 has classified touch 812 as potential-touch event 840. In some embodiments, since there are conflicting inferences for touch 852, the touch-event confidence value for touch 852 can be decreased less than when there are no conflicting inferences; e.g., classifying event 832 of 800B of FIG. 8A as potential-touch event 840 with wearer 810 asleep and wearable computing device 820 not being worn.

Figure 9:
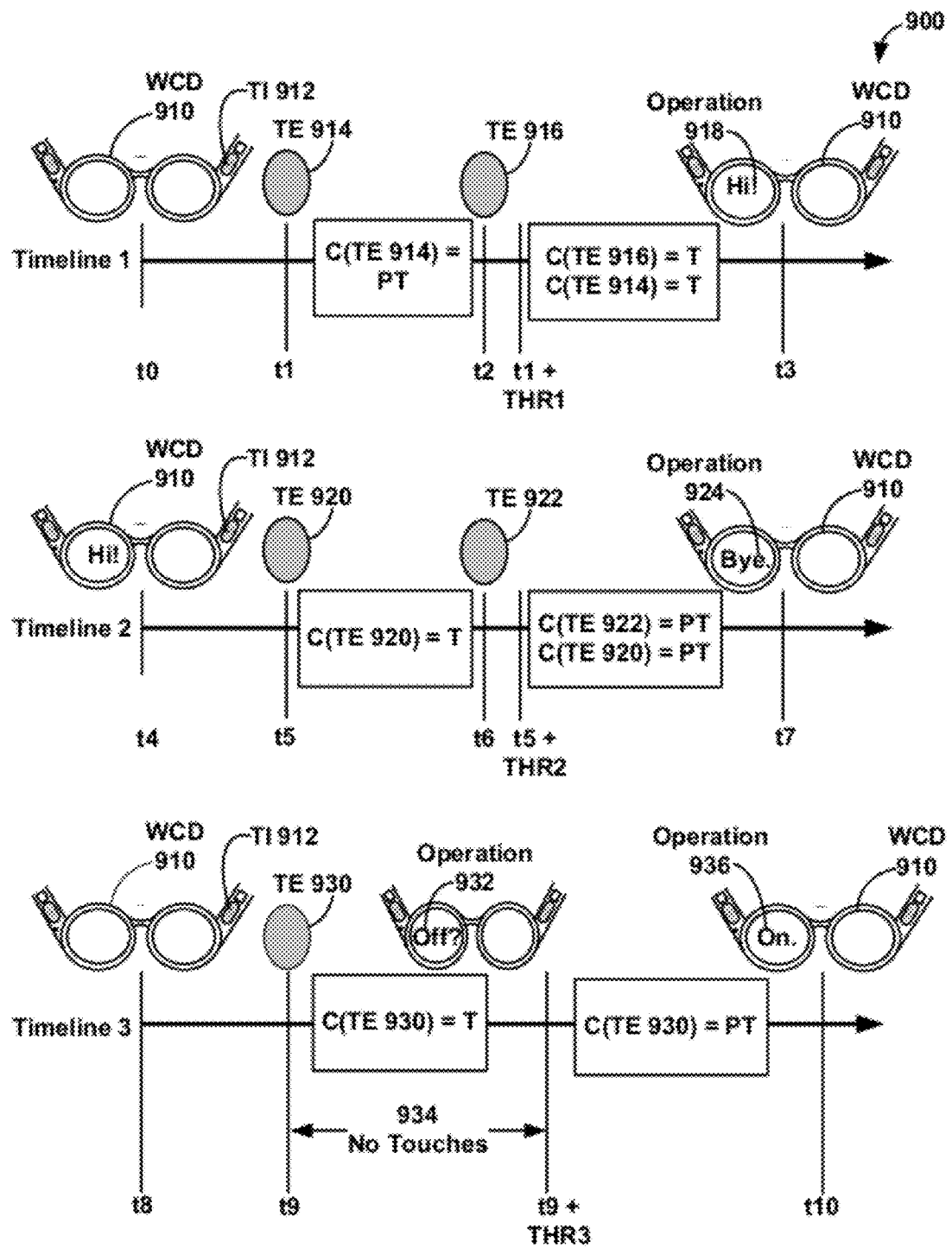
FIG. 9 depicts a third use scenario of a touch interface of a wearable computing device in light of contextual information, in accordance with an example embodiment.

FIG. 9 depicts a use scenario 900 of touch interface 912 of wearable computing device 910 in light of contextual information, in accordance with an example embodiment. FIG. 9 depicts three timelines, Timelines 1, 2, and 3, which occur in time order (e.g., Timeline 1 occurs before Timeline 2). These timelines are examples only; timing of actual performance of wearable computing device 910 may vary from any timing inferred from FIG. 9.

Scenario 900 of FIG. 9 begins with wearable computing device (WCD) 910 having touch interface (TI) 912 sitting idle, powered on, and not displaying text at time t0. At time t1, FIG. 9 shows touch event (TE) 914, depicted with a grey oval, being received at touch interface 910. After receiving touch event 914, wearable computing device 910 in scenario 900 classifies touch event 914 as a potential-touch (PT) event, as indicated using the box between markers t1 and t2 of Timeline with text of "C(TE 914)=PT" shown in FIG. 9.

In FIG. 9, text "C(x)" indicates a classification of an event x, text "PT" indicates a potential-touch event, and text "T" indicates a touch event. Therefore, the text "C(TE 914)=PT" indicates that the classification of touch event 914 is a potential-touch event.

Scenario 900 continues with touch event 916 being received at time t2 at touch interface 912. In scenario 900, touch event 916 occurs within a threshold THR1 period of time after time t1, shown in FIG. 9 by having a marker for time t2 on Timeline 1 between markers for times t1 and t1+THR. Based on receiving a second touch event, touch event 916, within the threshold period of time, wearable computing device 910 can classify touch event 916 as a touch (T). Further, wearable computing device 910 can also reclassify touch event 914 as a touch event based on classifying touch event 916 as a touch event. FIG. 9 depicts this reclassification using a box on Timeline 1 between times t1+THR1 and t3 with text of "C(TE 916)=T" and "C(TE 914)=T."

Reclassification of touch events can correspond to a variety of scenarios. For example, suppose is wearable computing device 910 is not being worn at time t0. Then, wearable computing device 910 can infer that touch event 914 is a potential-touch event, such as an accidental brushing of touch interface 912. When touch event 916 occurs within a threshold THR1 period of time, wearable computing device 910 can infer that touch event 916 is a touch event, due to receiving two touch events within the threshold THR1 period of time. Further, as touch event 916 is likely to be a touch event, wearable computing device 910 can infer that touch event 914 more likely was a touch event as well, and reclassify touch event 914 as a touch.

For example, suppose wearable computing device 910 requires a double tap (i.e., two quick touches) of touch interface 912 to wake up from a hibernation mode, and that touch events 914 and 916 are intended to be the double tap. Then, touch event 914 can be: (i) initially classified as a potential-touch event as wearable computing device 910 is idle, (ii) reclassified as a touch event based on the classification of touch event 916, and (iii) further characterized, in combination with touch event 916, as part of the double tap of touch interface 912 to wake up wearable computing device 910.

At time t3, in response to touch events 914 and 916, wearable computing device 910 can generate or change an operation, such as a display operation, a sound operation, a power-on/power-off/hibernation operation, input or output selection operation, and/or some other operation of wearable computing device 910. For example, FIG. 9 shows operation 918 shown in FIG. 9 using the word "Hi!"

Scenario 900 continues with Timeline 2 of FIG. 9. At time t4, wearable computing device 910 sits idle, powered up, and displaying text of "Hi!" At time t5, a touch event 920 is received at touch interface 912 of wearable computing device 910, and is classified as a touch event, as shown in FIG. 9 with the box between markers t5 and t6 with text "C(TE 920)=T." Then, at time t6, touch event 922 is received at touch interface 912 of wearable computing device 910. In scenario 900, touch event 922 is received within a threshold period of time THR2 of time t5 (when touch event 920 was received).

Based on reception of touch event 922 with threshold period of time THR2 of time t5, touch event 920 can be reclassified. As shown in FIG. 9, touch event 922 is classified as a potential-touch event in scenario 900 as indicated by the text of "C(TE 922)=PT" in the box between markers t5+THR2 and t7 of Timeline 2. Based on the classification of touch event 922 as a potential-touch event, touch event 920 can be reclassified as a potential-touch event.

For example, suppose a wearer of wearable computing device 910 touches touch interface 912 while taking off wearable computing device 910 to generate touch event 920. Then, after taking off wearable computing device 910, the wearer can use touch interface 912 to instruct wearable computing device 910 to power off, generating touch event 922. Then, based on changes in temperature and/or biological information between touch events 920 and 922, wearable computing device 910 can infer that touch event 920 was likely not a touch and reclassify touch event 920 as a potential-touch event.

In some embodiments, other sensors, such as a location sensor of environment sensor 416, can provide additional information that wearable computing device 910 is moving along a path that can be correlated to taking off the device. In still other embodiments, touches associated with power off events, can be classified as potential-touch events and force reclassification of previous touch events as potential-touch events. If wearable computing device 910 routinely ignores potential-touch events, this reclassification of previous touch events as potential-touch events can be used to enable wearable computing device 910 to ignore pending touch events while powering off, thus speeding power off processing.

Based on the reclassification of touch event 920 as a potential-touch event, an operation of wearable computing device 910 can be generated and/or changed. In scenario 900, operation 924 of displaying text on wearable computing device 910 is changed to displaying "Bye." at time t7, perhaps as part of a power off sequence, as discussed above.

Scenario 900 continues with Timeline 3 of FIG. 9 at time t8, with wearable computing device 910 sitting idle, powered on, and not displaying text. At time t9, touch event 930 is received at touch interface 912 of wearable computing device 910 and is classified as a touch event, as shown in FIG. 9 with text "C(TE 930)=T" in a box between markers t8 and t8+THR3 of Timeline 3. FIG. 9 also shows that, in response to touch event 930, wearable computing device 910 changes operation 932 of displaying text to display the word "Off?" between times t9 and t9+THR3.

FIG. 9 also shows that an event 934, which corresponds to receiving no touch events for a threshold period of time THR3 after time t9, can be observed by wearable computing device 910. In some embodiments, a "timer" event is generated upon expiration of a timer of duration THR3 and transmitted within wearable computing device 910. When wearable computing device 910 receives the timer event before a touch event is received via touch interface, wearable computing device 910 can infer that no touches have been received between time t9 and time t9+THR3. In other words, wearable computing device 910 can detect an absence of a second touch event subsequent to touch event 930 between times t9 and T9+THR3. Based on the inference that no touches have been received within threshold THR3 period of time, wearable computing device 910 can reclassify touch event 930.

For example, suppose wearable computing device 910 inferred that touch event 930 was the first tap of a double tap to deactivate or power down wearable computing device 910. Then, upon receiving touch event 930, wearable computing device 910 can change the display to read "Off?" and await the second tap of the double tap. Upon receiving the timer event indicating the end of the THR3 period of time, wearable computing device 910 can infer the second tap would not be forthcoming, and reclassify touch event 930 as a potential-touch event.

FIG. 9 shows the reclassification of touch event 930 as a potential-touch event using a box between the t9+THR3 and t10 markers of Timeline 3 that includes text of "C(TE 930)=PT." Based on reclassifying touch event 930 as a potential-touch event, wearable computing device 910 can change an operation of wearable computing device 910. FIG. 9 shows that, at time t10, wearable computing device 910 changed operation 936 of displaying text from displaying "Off?" to display the text "On."

Many other use scenarios for touch interfaces, with and without the use of contextual information are possible as well.

Example Operation

Figure 10:
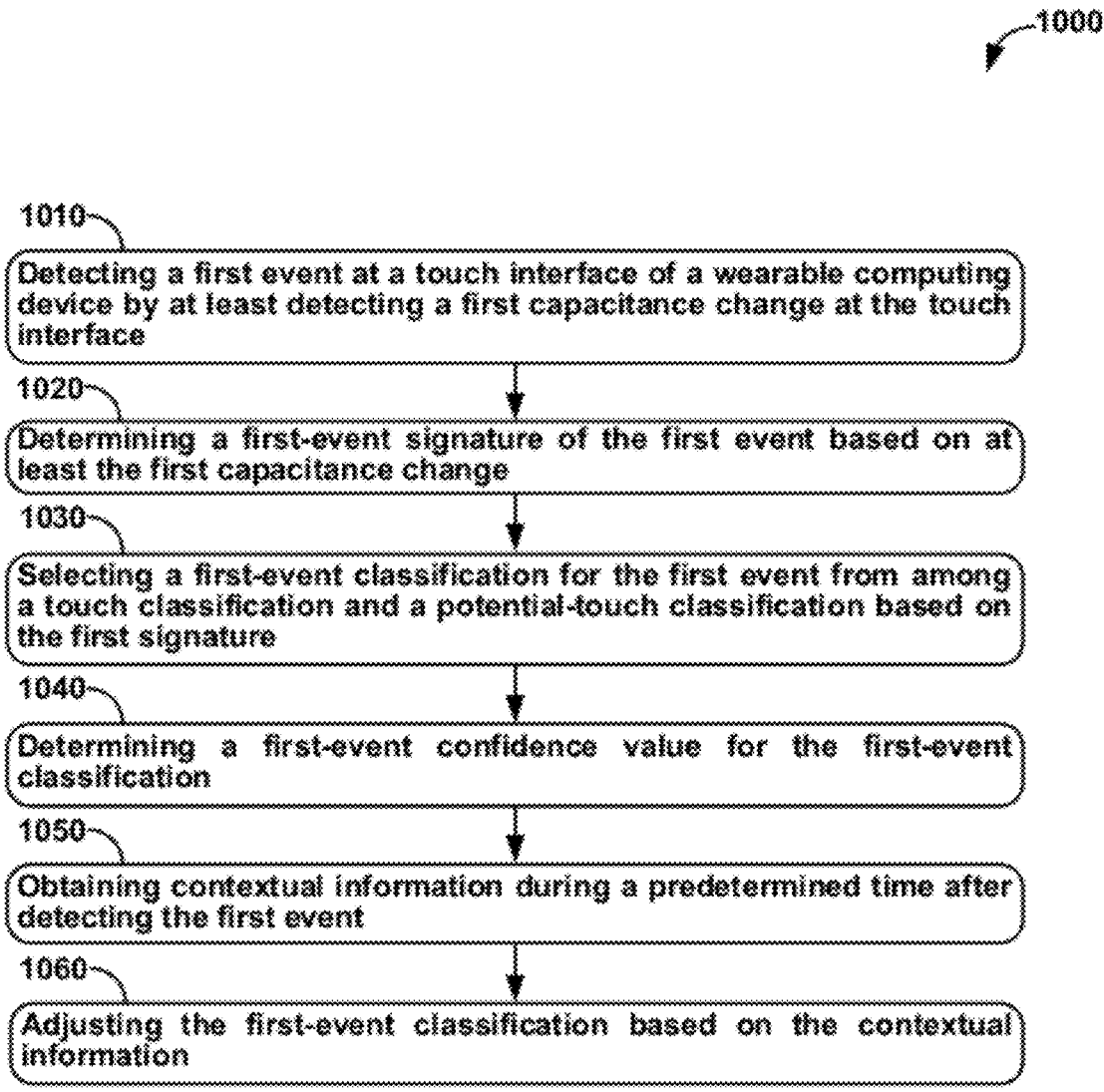
FIG. 10 is a flow chart of a method in accordance with an example embodiment.

FIG. 10 is a flow chart of a method 1000 in accordance with an example embodiment. At block 1010, a first event is detected at a touch interface of a wearable computing device. Detecting the first event can include detecting a first capacitance change at the touch interface. In some embodiments, detecting the first event can involve detecting other and/or additional changes than the first capacitance change; e.g., when the touch interface includes a touch interface utilizing a non-capacitive touch interface technology. Detecting events at a touch interface is described above with reference to at least FIGS. 4-9.

At block 1020, a first-event signature of the first event is determined based on at least the first capacitance change. Signatures of events are described above with reference to at least FIGS. 4, 5A, and 5B.

In some embodiments, such as described above with reference to at least FIGS. 4, 5A, and 5B, determining the first-event signature can include determining at least one of a magnitude of the first capacitance change, an area of the first capacitance change, and a location of the first capacitance change.

In other embodiments, such as described above with reference to at least FIGS. 6A-6D, determining the first-event signature can include determining a time profile of the first capacitance change.

At block 1030, a first-event classification for the first event is selected from among a touch classification and a potential-touch classification. The classification can be selected based on the first-event signature. Classifying events as touch events and potential-touch events is described above with reference to at least FIGS. 4-9.

In some embodiments, the first-event classification can be communicated using the wearable computing device, as described above with reference to at least FIG. 4.

At block 1040, a first-event confidence value for the first-event classification is determined. The error-correction filter can be configured to correct errors based on an input type associated with the given segment. Determining confidence values for event classifications is described above with reference to at least FIGS. 4, 5A, 5B, and 9.

In some embodiments, the first-event confidence value can be communicated using the wearable computing device, as described above with reference to at least FIG. 4.

At block 1050, contextual information is obtained during a predetermined time after detecting the first event. Obtaining contextual information during the predetermined time after detecting the first event can include detecting an absence of a second event at the touch interface during the predetermined time after detecting the first event. Obtaining contextual information during predetermined times after detecting events is discussed above in the context of at least FIGS. 6A-9.

In some embodiments, such as described above with reference to at least FIG. 9, obtaining contextual information during the predetermined time after detecting the first event includes: (a) detecting a second event at the touch interface of the wearable computing device, wherein detecting the second event comprises detecting a second capacitance change at the touch interface, (b) determining a second-event signature of the second event based on at least the second capacitance change, and (c) selecting a second-event classification for the second event from among the touch classification and the potential-touch classification based on the second-event signature.

In particular embodiments, such as described above with reference to at least FIG. 9, when the first-event classification is the potential-touch classification and the second-event classification is the touch classification, then adjusting the first-event classification based on the contextual information can include changing the first-event classification to the touch classification. In some of these particular embodiments, such as described above with reference to at least FIG. 9, an operation of the wearable computing device can be changed in response to changing the first-event classification to the touch classification.

In other particular embodiments, such as described above with reference to at least FIG. 9, when the first-event classification is the touch classification and the second-event classification is the potential-touch classification, then adjusting the first-event classification based on the contextual information can include changing the first-event classification to the potential-touch classification. In some of these other particular embodiments, such as described above with reference to at least FIG. 9, an operation of the wearable computing device can be changed in response to changing the first-event classification to the potential-touch classification.

In other embodiments, such as described above with reference to at least FIG. 9, when the first-event classification is the touch classification, adjusting the first-event classification based on the contextual information can include decreasing the first-event confidence value.

In some other embodiments, such as described above with reference to at least FIG. 9, when the first-event classification is the touch classification, adjusting the first-event classification based on the contextual information can include changing the first-event classification to the potential-touch classification.

In still other particular embodiments, such as described above in the context of FIGS. 4-8B, the contextual information can include at least one of: (a) a day of the week and a time of day, (b) a location of the wearable computing device, (c) information about a motion of the wearable computing device, (d) biological information about a person associated with the wearable computing device, (e) a temperature associated with the wearable computing device, (f) information indicating that a person associated with the wearable computing device is asleep, (g) information indicating that the person associated with the wearable computing device is not wearing the wearable computing device, and (h) information indicating that the person associated with the wearable computing device is wearing the wearable computing device.

In particular embodiments, such as described above in the context of FIGS. 7, 8A, and 8B, the biological information can include at least one of a pulse rate, a heart rate, and a breathing rate.

In other particular embodiments, such as described above in the context of FIGS. 8A and 8B, where the first-event classification is the touch classification, adjusting the first-event classification based on the contextual information comprises decreasing the first-event confidence value based on the information indicating that the person associated with the wearable computing device is asleep.

In still other particular embodiments, such as described above in the context of FIGS. 7 and 8A, where the first-event classification is the touch classification, adjusting the first-event classification based on the contextual information comprises decreasing the first-event confidence value based on the information indicating that the person associated with the wearable computing device is not wearing the wearable computing device.

In some of the still other particular embodiments, method 1000 can include: (a) detecting a second event at a touch interface of a wearable computing device, where detecting the second event comprises detecting a second capacitance change at the touch interface, (b) classifying the second event with the touch classification, and (c) in response to classifying the second event with the touch classification: (i) changing the information indicating that the person associated with the wearable computing device is not wearing the wearable computing device to information that the person associated with the wearable computing device is wearing the wearable computing device and (ii) increasing the first-event confidence value based on the information that the person associated with the wearable computing device is wearing the wearable computing device, as described above at least in the context of FIG. 8B.

In even other particular embodiments, such as described above in the context of FIGS. 7, 8A, and 8B, where the first-event classification is the touch classification, adjusting the first-event classification based on the contextual information comprises increasing the first-event confidence value based on the information indicating that the person associated with the wearable computing device is wearing the wearable computing device.

At block 1060, the first-event classification is adjusted based on the contextual information. The first-event classification can be adjusted directly, by changing the classification from a touch event to a potential-touch event or vice versa. The first-event classification can, also or instead, be adjusted indirectly—for example, the first-event confidence level can be changed and evaluated to see whether or not the changed first-event confidence level indicates that the first-event classification should be changed as well. In some scenarios, the first-event classification is maintained; i.e., an event can be classified as a touch event both before and after adjusting the touch event classification for the event. Adjusting event classifications is discussed above in the context of at least FIGS. 5B-9.

In some embodiments, such as discussed above in the context of at least FIGS. 6A-9, when the first-event classification is the potential-touch classification, adjusting the first-event classification based on the contextual information can include decreasing the first-event confidence value.

In some embodiments, the adjusted first-event classification can be communicated using the wearable computing device, as described above with reference to at least FIG. 4.

CONCLUSION

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   detecting a first event at a touch interface of a wearable computing device, wherein detecting the first event comprises detecting a first capacitance change at the touch interface;
   determining a first-event signature of the first event based on at least the first capacitance change;
   selecting a first-event classification for the first event from among a touch classification and a potential-touch classification based on the first-event signature;
   determining a first-event confidence value for the first-event classification;
   obtaining contextual information during a predetermined time after detecting the first event, comprising:
      detecting a second event at the touch interface of the wearable computing device, wherein detecting the second event comprises detecting a second capacitance change at the touch interface,
      determining a second-event signature of the second event based on at least the second capacitance change, and
      selecting a second-event classification for the second event from among the touch classification and the potential-touch classification based on the second-event signature; and
   adjusting the first-event classification for the first event at the touch interface based at least on the second-event classification for the second event at the touch interface.

2. The method of claim 1, wherein determining the first-event signature comprises determining at least one of a magnitude of the first capacitance change, an area of the first capacitance change, and a location of the first capacitance change.

3. The method of claim 1, wherein determining the first-event signature comprises determining a time profile of the first capacitance change.

4. The method of claim 1, wherein adjusting the first-event classification comprises adjusting the first-event classification based on a classification-resolution rule.

5. The method of claim 1, wherein the first-event classification is the potential-touch classification and the second-event classification is the touch classification, and
   wherein adjusting the first-event classification comprises changing the first-event classification to the touch classification.

6. The method of claim 5, further comprising:
   in response to changing the first-event classification to the touch classification, changing an operation of the wearable computing device.

7. The method of claim 1, wherein the first-event classification is the touch classification and the second-event classification is the potential-touch classification, and
   wherein adjusting the first-event classification comprises changing the first-event classification to the potential-touch classification.

8. The method of claim 7, further comprising:
in response to changing the first-event classification to the potential-touch classification, changing an operation of the wearable computing device.

9. The method of claim 1, wherein the first-event classification is the touch classification, and
wherein adjusting the first-event classification comprises decreasing the first-event confidence value.

10. The method of claim 9, wherein adjusting the first-event classification further comprises:
in response to decreasing the first-event confidence value, changing the first-event classification to the potential-touch classification.

11. The method of claim 1, wherein obtaining the contextual information during the predetermined time after detecting the first event further comprises detecting an absence of a third event at the touch interface during the predetermined time after detecting the second event.

12. The method of claim 1, wherein the contextual information further comprises at least one of: (a) a day of the week and a time of day, (b) a location of the wearable computing device, (c) information about a motion of the wearable computing device, (d) biological information about a person associated with the wearable computing device, (e) a temperature associated with the wearable computing device, (f) information indicating that a person associated with the wearable computing device is asleep, (g) information indicating that the person associated with the wearable computing device is not wearing the wearable computing device, and (h) information indicating that the person associated with the wearable computing device is wearing the wearable computing device.

13. The method of claim 12, wherein the biological information comprises at least one of a pulse rate, a heart rate, and a breathing rate.

14. The method of claim 12, wherein the first-event classification is the touch classification, and
wherein adjusting the first-event classification comprises decreasing the first-event confidence value based on the information indicating that the person associated with the wearable computing device is asleep.

15. The method of claim 12, wherein the first-event classification is the touch classification, and
wherein adjusting the first-event classification comprises decreasing the first-event confidence value based on the information indicating that the person associated with the wearable computing device is not wearing the wearable computing device.

16. The method of claim 15,
wherein selecting the second-event classification for the second event from among the touch classification and the potential-touch classification based on the second-event signature comprises selecting the second event as the touch classification; and
wherein the method further comprises:
in response to selecting the second event as the touch classification:
changing the information indicating that the person associated with the wearable computing device is not wearing the wearable computing device to information that the person associated with the wearable computing device is wearing the wearable computing device, and
increasing the first-event confidence value based on the information that the person associated with the wearable computing device is wearing the wearable computing device.

17. The method of claim 12, wherein the first-event classification is the touch classification, and
wherein adjusting the first-event classification comprises increasing the first-event confidence value based on the information indicating that the person associated with the wearable computing device is wearing the wearable computing device.

18. A wearable computing device, comprising:
a touch interface;
a processor; and
memory having one or more instructions that, in response to execution by the processor, cause the wearable computing device to perform functions comprising:
detecting a first event at the touch interface by at least detecting a first capacitance change at the touch interface;
determining a first-event signature of the first event based on at least the first capacitance change;
selecting a first-event classification for the first event from among a touch classification and a potential-touch classification based on the first-event signature;
determining a first-event confidence value for the first-event classification;
obtaining contextual information during a predetermined time after detecting the first event, comprising:
detecting a second event at the touch interface, wherein detecting the second event comprises detecting a second capacitance change at the touch interface,
determining a second-event signature of the second event based on at least the second capacitance change, and
selecting a second-event classification for the second event from among the touch classification and the potential-touch classification based on the second-event signature; and
adjusting the first-event classification for the first event at the touch interface based at least on the second-event classification for the second event at the touch interface.

19. The wearable computing device of claim 18, wherein the function of adjusting the first-event classification comprises adjusting the first-event classification based on a classification-resolution rule.

20. An article of manufacture including a non-transitory computer-readable storage medium having instructions stored thereon that, in response to execution by a processor, cause the processor to perform functions, the instructions comprising:
instructions for detecting a first event at a touch interface by at least detecting a first capacitance change at the touch interface;
instructions for determining a first-event signature of the first event based on at least the first capacitance change;
instructions for selecting a first-event classification for the first event from among a touch classification and a potential-touch classification based on the first-event signature;
instructions for determining a first-event confidence value for the first-event classification;
instructions for obtaining contextual information during a predetermined time after detecting the first event, comprising instructions for:
detecting a second event at the touch interface, wherein detecting the second event comprises detecting a second capacitance change at the touch interface, determining a second-event signature of the second event based on at least the second capacitance change, and selecting a second-event classification for the second event from among the touch classification and the potential-touch classification based on the second-event signature; and instructions for adjusting the first-event classification for the first event at the touch interface based at least on the second-event classification for the second event at the touch interface.

* * * * *